(12) United States Patent
Bushnell

(10) Patent No.: US 7,203,077 B2
(45) Date of Patent: Apr. 10, 2007

(54) RESONANT CHARGE POWER SUPPLY TOPOLOGY FOR HIGH PULSE RATE PULSED POWER SYSTEMS

(75) Inventor: Andrew Hugh Bushnell, San Diego, CA (US)

(73) Assignee: General Atomics Electronic Systems, Inc., San Diego, CA (US)

( * ) Notice: Subject to any disclaimer, the term of this patent is extended or adjusted under 35 U.S.C. 154(b) by 83 days.

(21) Appl. No.: 11/185,414

(22) Filed: Jul. 20, 2005

(65) Prior Publication Data

US 2007/0019451 A1    Jan. 25, 2007

(51) Int. Cl.
*H02M 3/335* (2006.01)

(52) U.S. Cl. .......................................... 363/17; 363/98
(58) Field of Classification Search ............ 363/15–17, 363/21.02, 21.03, 56.02, 56.05, 56.11, 56.12, 363/98, 132
See application file for complete search history.

(56) References Cited

U.S. PATENT DOCUMENTS

| | | | |
|---|---|---|---|
| 3,579,086 A | 5/1971 | Lebenbaum, Jr. | |
| 4,510,576 A | 4/1985 | MacArthur et al. | |
| 5,218,283 A | 6/1993 | Wills et al. | |
| 5,300,871 A | 4/1994 | Bucher et al. | |
| 5,325,034 A | 6/1994 | Reynolds | |
| 5,650,697 A | 7/1997 | Imagi et al. | |
| 5,780,990 A | 7/1998 | Weber | |
| 5,883,490 A | 3/1999 | Moreira | |
| 6,037,725 A | 3/2000 | Tolbert, Jr. | |
| 6,160,374 A * | 12/2000 | Hayes et al. ................ | 320/108 |
| 6,208,113 B1 | 3/2001 | Lelkes et al. | |
| 6,275,391 B1 * | 8/2001 | Laskai et al. ................. | 363/24 |
| 6,661,205 B1 * | 12/2003 | Muraki et al. ............... | 320/166 |
| 6,713,986 B1 | 3/2004 | Jayadev et al. | |
| 6,744,649 B1 * | 6/2004 | Yang et al. .................... | 363/98 |

* cited by examiner

*Primary Examiner*—Gary L. Laxton
(74) *Attorney, Agent, or Firm*—Nydegger & Associates

(57) ABSTRACT

A system for charging a capacitor with relatively high energy pulses at a relatively high pulse repetition rate includes a voltage transformer. A resonant circuit is established having an inductor connected to the transformer's low voltage side and a capacitor connected to the transformer's high voltage side. A power supply cooperates with a switch assembly to generate a train of pulses, alternating in polarity, in the circuit. With this arrangement, the transformer core is reset after each pulse. A rectifying circuit operates on the alternating polarity pulses to create a train of constant polarity pulses for charging the capacitor. For the system, the maximum charging voltage is regulated by a control circuit having a probe for measuring the voltage across the charging capacitor. This measured voltage is used by the control circuit to selectively operate the switch assembly and regulate the maximum voltage across the capacitor.

20 Claims, 2 Drawing Sheets

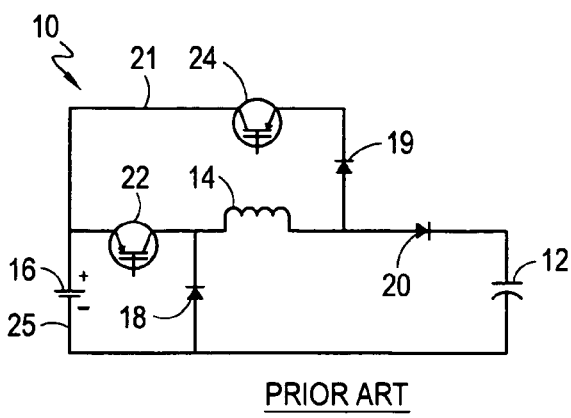
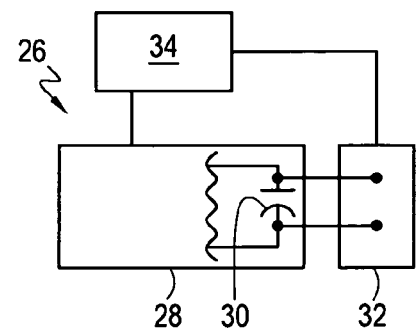
Fig. 1 PRIOR ART
Fig. 2
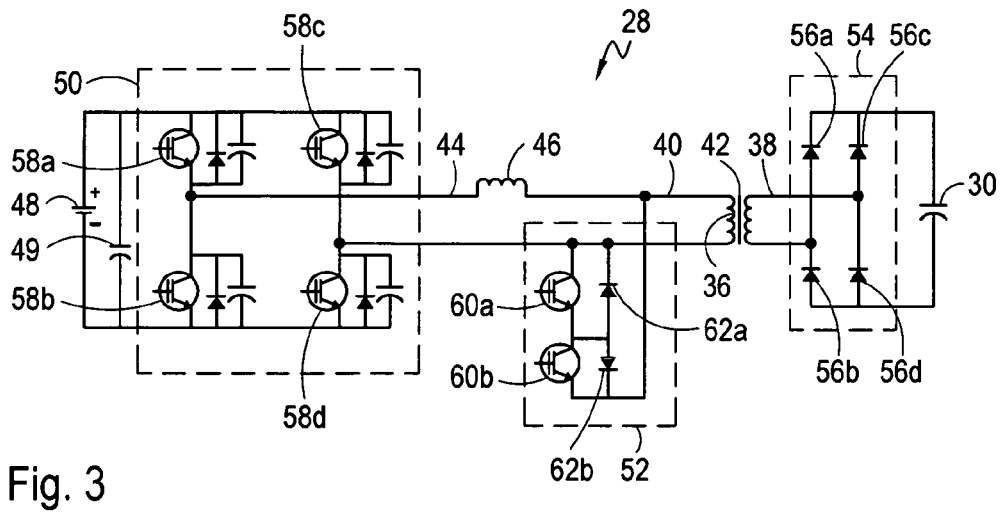
Fig. 3
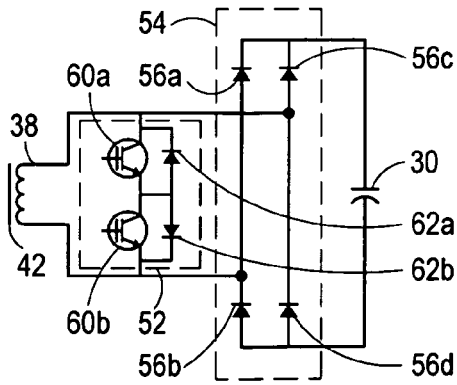
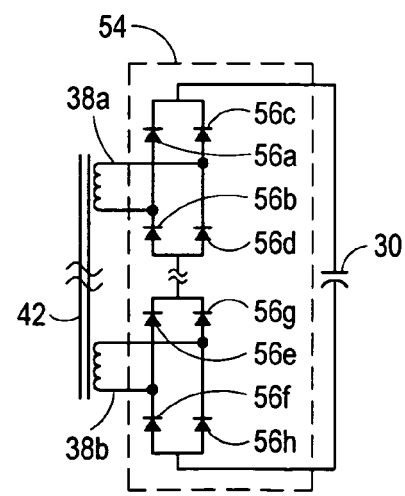
Fig. 4
Fig. 5

RESONANT CHARGE POWER SUPPLY TOPOLOGY FOR HIGH PULSE RATE PULSED POWER SYSTEMS

FIELD OF THE INVENTION

The present invention pertains generally to electrical power systems. More particularly, the present invention pertains to high voltage, pulsed power systems. The present invention is particularly, but not exclusively, useful as a power system having a capacitor that is charged with pulses at a relatively high pulse repetition rate.

BACKGROUND OF THE INVENTION

Several types of modern equipment require an electrical power supply that is capable of producing high energy pulses at a very high pulse repetition rate. Examples of these include, but are not necessarily limited to, certain laser systems, and more modernly, extreme ultraviolet (EAV) sources for advanced photolithography techniques.

Heretofore, resonant circuits that are configured to charge a capacitor have been employed when power at a high pulse repetition rate has been required. These resonant circuits typically include an inductor in addition to the capacitor. When a power source (e.g. battery) is connected to the resonant circuit and activated, a voltage appears across the capacitor that increases from zero to a maximum value during a time period, t, defined by the LC circuit. After the voltage across the capacitor reaches the maximum value, a load (e.g. UAV laser) can be connected to the resonant circuit to discharge the capacitor and energize the load. This sequence of charging and discharging the capacitor can be repeated, as desired, to drive the load with a train of substantially constant energy pulses.

One problem associated with the above-described resonant charge circuit is the regulation of the maximum voltage across the capacitor. Specifically, any residual voltage on the capacitor (i.e. voltage remaining between pulses) will affect the maximum voltage on the capacitor at the end of a charge transfer. In attempts to overcome this difficulty, dequeing techniques have been developed and used. In general, these dequeing techniques have employed a voltage probe to monitor the voltage across the capacitor. When the desired voltage is reached, a switch is used to divert current from the resonant circuit, and as a result, stop all charge transfer to the capacitor.

By way of example, FIG. 1 shows a typical, prior art resonant circuit (generally designated 10) that uses a dequeing technique to charge a capacitor 12 at a high pulse repetition rate. As shown, the resonant circuit 10 includes an inductor 14, a power source 16, diodes 18, 19, 20 and two transistor switches 22, 24 (note: the circuit 10 also requires a voltage probe and control circuit that are not shown in FIG. 1). Operation of the resonant circuit 10 begins by closing switch 22 at time t=0. With switch 22 closed, the capacitor 12 is resonantly charged with current that passes through the diode 20 and inductor 14. Once the voltage probe indicates that a desired voltage across capacitor 12 has been reached, the control circuit quickly closes switch 24. With switch 24 closed, all remaining current in the circuit 10 is routed through the circuit branch 21 having switch 22, switch 24 and the inductor 14. With the circuit 10 in this configuration, all current flow to the capacitor 12 is stopped. Switch 22 is then opened, diverting current from branch 21 through a circuit branch 25 having the power source 16, diode 18, inductor 14 and switch 24. This allows the energy in the inductor 14 to be returned to the source 16 and recovered. The charge across the capacitor 12 can then be maintained until required by a load (not shown). Once the capacitor 12 has been discharged, switch 24 is then opened, configuring the circuit 10 to generate the next pulse.

In a typical setup of the prior art resonant circuit 10 shown in FIG. 1, the desired voltage across the capacitor 12 is selected to be less than the peak voltage generated by the resonant circuit 10, which in turn, is typically about twice the voltage of the source 16. For the circuit 10, the switches 22, 24 are preferably constructed of either MOSFET's or IGBT's, which unfortunately, have limited voltage ratings. Specifically, operational charging voltages for the circuit 10, as shown, have been generally limited to a maximum voltage that is below about 2 kV.

In light of the above, it is an object of the present invention to provide a power supply that is capable of producing pulses at a very high pulse repetition rate and that is operable at relatively high voltages (i.e. greater than about 2 kV). It is yet another object of the present invention to provide a system for charging a capacitor at a high voltage and high pulse repetition rate while accurately regulating the maximum voltage across the capacitor. Yet another object of the present invention is to provide a high pulse rate, pulsed power system which is easy to use, relatively simple to implement, and comparatively cost effective.

SUMMARY OF THE PREFERRED EMBODIMENTS

The present invention is directed to a power supply system that charges a capacitor with relatively high energy pulses, at a relatively high pulse repetition rate. The system works in conjunction with a load (e.g. UAV laser lamps) that is switchably connected to the capacitor. At the end of each pulse, the load is connected (i.e. switched) across the capacitor. This then discharges the capacitor and energizes the load.

For the system, a voltage transformer having a high voltage side, a low voltage side and a transformer core is provided. In addition, a resonant circuit having an inductor and a capacitor is connected to the transformer. Specifically, the inductor is connected to the low voltage side of the transformer and the capacitor is connected to the high voltage side of the transformer. With this cooperation of structure, a power supply and switch assembly are connected to the low voltage side of the transformer and configured to generate a pulse in the resonant circuit. This, in turn, generates a high energy pulse on the high voltage side of the transformer that charges the capacitor. The capacitor is then discharged by the load.

In greater structural detail, the switch assembly is configured to generate pulses on the low side of the transformer that alternate in polarity. With this arrangement of alternating pulses, the transformer core is reset after each pulse. The system also includes a rectifying circuit that is connected to the high voltage side of the transformer. In functional terms, this circuit rectifies the alternating polarity pulses from the low side of the transformer to produce a train of constant polarity pulses for charging the capacitor.

To generate the pulses that alternate in polarity on the low voltage side of the transformer, the switch assembly is connected between the power source and the transformer. In one embodiment, a switch assembly is used having four transistors and four diodes that are arranged as an H bridge. Because the transistors operate on the low voltage side of the transformer, standard MOSFET or IGBT type low voltage transistors are typically used. Functionally, with the H bridge arrangement, a first pair of transistors are opened while a second pair of transistors remain closed to produce the first pulse. After the load discharges the capacitor, the first pair of transistors are closed and the second pair of transistors are opened to produce a second pulse having a polarity that is opposite to the first pulse. This process is repeated to generate a continuous train of pulses in the circuit on the low side of the transformer that alternate in polarity.

In another aspect of the present invention, the system includes a control circuit for regulating the maximum voltage that is applied to charge the capacitor. This control circuit includes a probe for measuring a voltage across the capacitor. This measured voltage, in turn, is used by the control circuit to selectively open and close the transistor pairs in the switch assembly to regulate the maximum voltage across the capacitor. In particular, the transistor pair in the switch assembly, that is initially closed to create a pulse, is subsequently opened when the voltage across the capacitor reaches a pre-selected magnitude.

In a particular embodiment of the system, the control circuit includes a crowbar switch that is connected to the low voltage side of the transformer. Structurally, the crowbar switch includes a circuit that is connected to the low side of the transformer and includes two switches and two diodes. When activated, the crowbar switch short-circuits the low side of the transformer. The crowbar switch is required to divert the energy stored in the inductor. Energy from the inductor resonantly transfers back to a filter capacitor and is recovered. In use, the crowbar switch is activated in response to the voltage probe and works in concert with the switch assembly to regulate the maximum voltage across the capacitor. Specifically, the crowbar switch closes to short-circuit the low voltage side of the transformer when the voltage across the capacitor reaches a pre-selected magnitude.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a schematic diagram of a prior art, resonant circuit for charging a capacitor;

FIG. 2 is a simplified schematic diagram of a high pulse rate, pulsed power system in accordance with the present invention;

FIG. 3 is a schematic diagram showing an arrangement of electrical components for charging a capacitor in accordance with the present invention;

FIG. 4 is a schematic diagram showing an alternate embodiment of the high voltage side of the transformer shown in FIG. 3 in accordance with the present invention;

FIG. 5 is a schematic diagram showing another alternate embodiment of the high voltage side of the transformer shown in FIG. 3 in accordance with the present invention;

DESCRIPTION OF THE PREFERRED EMBODIMENT

Figure 6:
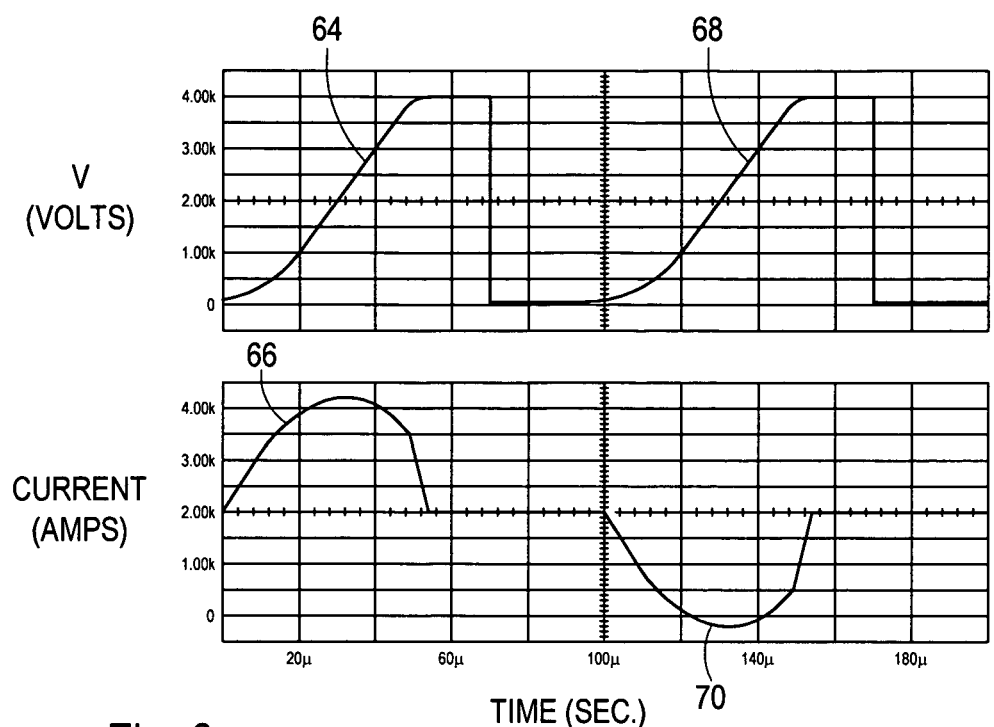
FIG. 6 is a plot showing waveforms from a SPICE model computer simulation for the circuit shown in FIG. 3, with the upper plot showing the voltage across the capacitor as a function of time and the lower plot showing the current through the resonant inductor as a function of time (note: voltage regulation is shown without activation of the crowbar switch)

Referring to FIG. 2, a high pulse rate, pulsed power system is shown and generally designated 26. As shown in FIG. 2, the system 26 includes a pulsed charging circuit 28 for charging a capacitor 30. The system 26 further includes a voltage probe 32 and a control circuit 34. In functional overview, the pulsed charging circuit 28 is configured to establish voltage pulses across the capacitor 30 which are monitored by the voltage probe 32. The control circuit 34 then receives the output of the voltage probe 32 and uses that output to selectively open and close transistor switches in the charging circuit 28. In this manner, the control circuit 34 cooperates with the charging circuit 28 to regulate a maximum voltage across the capacitor 30.

FIG. 3 shows the charging circuit 28 in greater detail. As seen there, the charging circuit 28 includes a voltage transformer 36 having a high voltage side 38, a low voltage side 40 and a transformer core 42. In addition, a resonant circuit 44 that includes the charging capacitor 30 and an inductor 46 is connected to the transformer 36, as shown. Specifically, it can be seen that the inductor 46 is connected to the low voltage side 40 of the transformer 36 and the charging capacitor 30 is connected to the high voltage side 38 of the transformer 36. FIG. 3 further shows that the charging circuit 28 includes a power source 48, a filter capacitor 49 and a switch assembly 50, all of which are connected to the low voltage side 40 of the transformer 36. In addition, for the charging circuit 28 shown, a crowbar switch 52 is connected to the low voltage side 40 of the transformer 36. It can further be seen that the charging circuit 28 includes a rectifying circuit 54 connected to the high voltage side 38 of the transformer 36.

Functionally, the switch assembly 50 and power source 48 shown in FIG. 3 cooperate, under the control of the control circuit 34 (see FIG. 2), to generate a series of pulses in the resonant circuit 44 that alternate in polarity. With this arrangement, the transformer core 42 is reset after each pulse. A rectifying circuit 54 is connected to the high voltage side 38 of the transformer 36 and four high voltage diodes 56a–d. Functionally, the circuit 54 rectifies the alternating polarity pulses from the transformer 36 to feed the capacitor 30 with a train of constant polarity pulses.

The switch assembly 50 can now be described with reference to FIG. 3. As shown there, the switch assembly 50 is connected between the power source 48 and the transformer 36. For the embodiment shown in FIG. 3, the switch assembly 50 includes four transistor switches 58a–d that are arranged as an H bridge. Within the H bridge, each transistor switch 58a–d is coupled in parallel with a respective diode and capacitor, as shown. For the crowbar switch 52, two transistor switches 60a,b are arranged with two low voltage diodes 62a,b, as shown. Because the transistor switches (i.e. switches 58a–d, 60a,b) are positioned on the low voltage side 40 of the transformer 36, standard MOSFET or IGBT type low voltage transistors can be used. Alternatively, thyristors may be used instead of transistor switches. Additionally, several transistor switches or thyristors could be used in series in the crowbar switch 52.

FIG. 4 shows an alternate embodiment of the high voltage side 38 of the transformer 36. As seen there, a crowbar switch 52 is repositioned on the high voltage side 38. For the crowbar switch 52, two transistor switches 60a,b are arranged with two high voltage diodes 62a,b, as shown. Because these transistor switches 60a,b are positioned on the high voltage side 38 of the transformer 36, instead of on the low voltage side 40, high voltage transistors must be used. The crowbar switch 52 may be positioned on the high voltage side 38 in addition to, or in lieu of, the crowbar switch 52 provided on the low voltage side 40 in FIG. 3. The rectifying circuit 54 remains unchanged from that shown in FIG. 3, with high voltage diodes 56a–d. Functionally, the circuit 54 rectifies the alternating polarity pulses from the transformer 36 to feed the capacitor 30 with a train of constant polarity pulses.

FIG. 5 shows another alternate embodiment of the high voltage side 38 of the transformer 36. In FIG. 5, two high voltage sides 38a,b are shown operating with the transformer core 42. Each high voltage side 38a,b is connected to a rectifying circuit 54 that rectifies the alternating polarity pulses from the transformer 36 to feed the capacitor 30 with a train of constant polarity pulses. The rectifying circuits 54 include high voltage diodes 56a–d and 56e–h and are connected in series with the capacitor 30.

Figure 7:
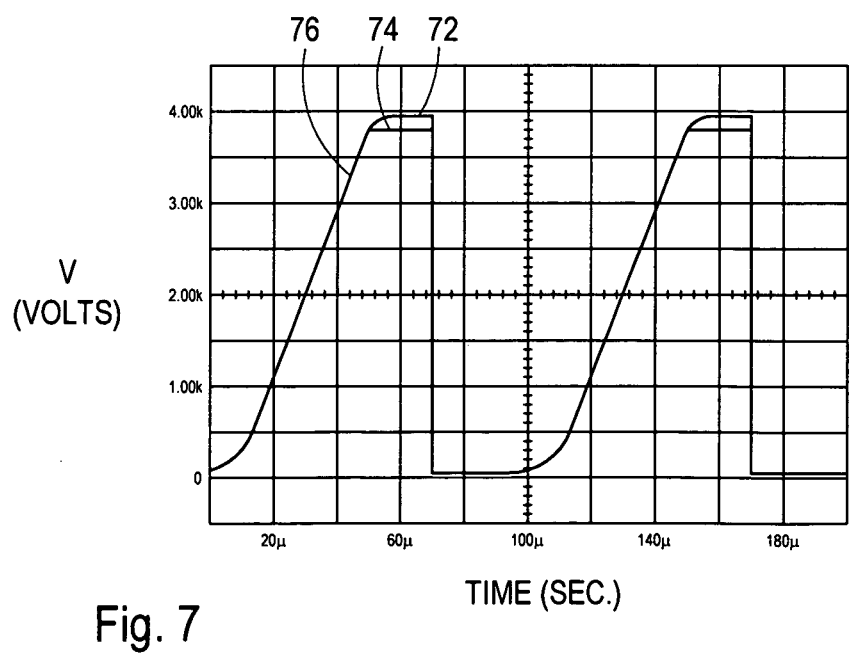
FIG. 7 is a plot as in FIG. 6 of the voltage across the capacitor as a function of time without the activation of the crowbar switch in comparison with the voltage across the capacitor as a function of time with activation of the crowbar switch.

Operation of the charging circuit 28 can perhaps best be understood with cross-reference to FIGS. 3 and 6. Initially, all switches 58a–d, 60a,b are configured in an open state and no current flows through the circuit. Next, at time t=0, switches 58a and 58d are closed by the control circuit 34 (see FIG. 2). FIG. 6 shows that after switches 58a and 58d are closed, a rising voltage is established (plot portion 64) across the capacitor 30 and a positive current, which peaks sinusoidally and then falls toward zero (plot portion 66), is passed through the inductor 46. Note: FIGS. 6 and 7 are SPICE model computer plots for a charging circuit 28 having an 1100V power source 48, a 240 µH inductor 46 and a 0.44 µF charging capacitor 30.

FIG. 6 illustrates that at a time t=50 µS, the desired voltage across capacitor 30, which in this case is about 3.80 KV, is reached. At this point the control circuit 34 (see FIG. 2) opens switches 58a and 58d. Current in the inductor 46 then flows through the two diodes that are connected in parallel with switches 58b and 58c, transferring the energy in the inductor 46 to the power source 48 and the capacitor 30. As shown in FIG. 6, this causes a small overshoot voltage across the capacitor 30 (i.e. the maximum voltage across capacitor 30 reaches about 4.00 KV, 0.20 KV higher than the desired voltage of 3.80 KV). This overshoot can be corrected during calibration, or as detailed below, with the use of the crowbar switch 52.

FIG. 6 shows that at about t=56 µS, there is zero current through the inductor 46 and at about t=70 µS, the capacitor 30 is discharged. The charging circuit 28 is now ready to generate another pulse. Continuing with cross reference to FIGS. 3 and 6, for the system 26, the second pulse is generated by simultaneously closing switches 58b and 58c. FIG. 6 shows the voltage and current plots generated when the switches 58b and 58c are closed at time t=100 µS by the control circuit 34 (see FIG. 2). Specifically, FIG. 6 shows that after switches 58b and 58c are closed, a rising positive voltage is established (plot portion 68) across the capacitor 30 and a negative current, which peaks sinusoidally and then returns toward zero (plot portion 70), is passed through the inductor 46. Thus, from FIG. 6 it can be seen that the polarity of the current pulses through the inductor 46 alternates with each pulse. With this arrangement, the core 42 of the transformer 36 is reset after each pulse. On the other hand, FIG. 6 shows that the polarity of voltage pulses across the capacitor 30 remains constant due to the rectifying circuit 54.

Continuing with FIGS. 3 and 6, when the desired voltage across capacitor 30 of about 3.80 KV is reached for the second pulse (i.e. at time t=150 µS), the control circuit 34 (see FIG. 2) opens switches 58b and 58c. Current in the inductor 46 then flows through the diodes that are connected in parallel with switches 58a and 58d, transferring the energy in the inductor 46 to the power source 48 and the capacitor 30. As shown in FIG. 6, this again causes a small overshoot voltage across the capacitor 30 of about 0.20 KV. FIG. 6 shows that at about t=156 µS, there is zero current through the inductor 46 and at about t=170 µS, the capacitor 30 is discharged. The charging circuit 28 is now ready to generate another pulse having a positive current through the inductor 46.

FIG. 7 illustrates the use of the crowbar switch 52 (FIG. 3) to reduce or eliminate the overshoot described above. Specifically, plot portion 72 shows the voltage across the capacitor 30 as a function of time without the activation of the crowbar switch 52, and plot portion 74 shows the voltage across the capacitor 30 as a function of time with activation of the crowbar switch 52. In greater detail, the operation of the crowbar switch 52 can perhaps best be understood with cross-reference to FIGS. 3 and 7. Initially, all switches 58a–d, 60a,b are configured in an open state and no current flows through the circuit. Next, at time t=0, switches 58a and 58d are closed by the control circuit 34 (see FIG. 2). FIG. 7 shows that after switches 58a and 58d are closed, a rising voltage is established (plot portion 76) across the capacitor 30. FIG. 7 illustrates that at a time t=50 µS, the desired voltage across the capacitor 30, which in this case is about 3.80 KV, is reached. At this point the control circuit 34 (see FIG. 2) opens switches 58a and 58d, and closes switches 60a and 60b. Functionally, the crowbar switch 52 closes to short the low voltage side 40 of the transformer 36 when the voltage across the charging capacitor 30 reaches the desired voltage. With the transformer 36 short-circuited, current in the inductor 46 flows through the diodes that are connected in parallel with switches 58b and 58c, transferring the energy in the inductor 46 to the filter capacitor 49. As illustrated in FIG. 7, this reduces the overshoot voltage across the capacitor 30.

Referring back to FIG. 4, it can be seen that operation of the charging circuit for this alternate embodiment is similar to the above discussion relating to FIG. 3. Initially, all switches 58a–d (see FIG. 3) and 60a,b are configured in an open state and no current flows through the circuit. Next, at time t=0, switches 58a and 58d are closed by the control circuit 34 (see FIGS. 2 and 3). FIG. 7 shows that after switches 58a and 58d are closed, a rising voltage is established (plot portion 76) across the capacitor 30. FIG. 7 illustrates that at a time t=50 µS, the desired voltage across the capacitor 30 is reached. At this point the control circuit 34 (see FIG. 2) opens switches 58a and 58d, and closes switches 60a and 60b. Functionally, the crowbar switch 52 closes to short the high voltage side 38 when the voltage across the charging capacitor 30 reaches the desired voltage. With the transformer 36 short-circuited, current in the inductor 46 flows through the diodes that are connected in parallel with switches 58b and 58c, transferring the energy in the inductor 46 to the filter capacitor 49. As illustrated in FIG. 7, this reduces the overshoot voltage across the capacitor 30.

While the particular Resonant Charge Power Supply Topology For High Pulse Rate Pulsed Power Systems as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A pulsed power system comprising:
   a voltage transformer having a high voltage side, a low voltage side and a core;
   a resonant circuit having an inductor and a charging capacitor, with the inductor connected to the low voltage side of the transformer and the charging capacitor connected to the high voltage side of the transformer;
   a circuit for rectifying power between the transformer and the charging capacitor;
   a power supply; and
   a switch assembly connected between the power supply and the low voltage side of the transformer, the switch assembly configured to generate pulses in the resonant circuit with the pulses alternating in polarity to reset the transformer core after each pulse.

2. A system as recited in claim 1 further comprising a crowbar switch connected to the low side of the transformer for concerted operation with the switch assembly to regulate a maximum voltage across the charging capacitor.

3. A system as recited in claim 1 wherein the switch assembly comprises four transistors and four diodes arranged as an H bridge.

4. A system as recited in claim 3 wherein the transistors are MOSFET's.

5. A system as recited in claim 3 wherein the transistors are IGBT's.

6. A system as recited in claim 1 further comprising a probe for measuring a voltage across the charging capacitor and wherein the switch assembly is responsive to the measured voltage to regulate a maximum voltage across the charging capacitor.

7. A system as recited in claim 6 further comprising a crowbar switch connected to the low voltage side of the transformer and wherein the crowbar switch is responsive to the measured voltage to regulate a maximum voltage across the charging capacitor.

8. A system as recited in claim 1 wherein the rectifying circuit comprises a first pair of diodes in parallel with a second set of diodes.

9. A system as recited in claim 8 wherein the capacitor is connected in parallel with the second set of diodes.

10. A pulsed power system comprising:
    a voltage transformer having a high voltage side, a low voltage side and a core;
    a resonant circuit having an inductor and a charging capacitor, with the inductor connected to the low voltage side of the transformer and the charging capacitor connected to the high voltage side of the transformer;
    a circuit for rectifying power between the transformer and the charging capacitor;
    a means for generating pulses in the resonant circuit, the pulses alternating in polarity to reset the transformer core after each pulse;
    a probe for measuring a voltage across the charging capacitor; and
    a means responsive to the probe for regulating a maximum voltage across the charging capacitor.

11. A system as recited in claim 10 wherein said regulating means comprises a crowbar switch connected to the low voltage side of the transformer.

12. A system as recited in claim 10 wherein said regulating means comprises a switch assembly connected between the power supply and the low voltage side of the transformer.

13. A system as recited in claim 10 wherein the generating means comprises a power supply and a switch assembly.

14. A system as recited in claim 13 wherein the switch assembly comprises four transistors and four diodes arranged as an H bridge.

15. A system as recited in claim 14 wherein the transistors are MOSFET's.

16. A system as recited in claim 14 wherein the transistors are IGBT's.

17. A system as recited in claim 10 wherein the rectifying circuit comprises a first pair of diodes in parallel with a second set of diodes.

18. A system as recited in claim 17 wherein the charging capacitor is connected in parallel with the second set of diodes.

19. A method for producing pulsed power, the method comprising the steps of:
    providing a voltage transformer having a high voltage side, a low voltage side and a core;
    connecting a resonant circuit having an inductor and a charging capacitor to the transformer, the inductor being connected to the low voltage side of the transformer and the charging capacitor being connected to the high voltage side of the transformer;
    rectifying power from the high voltage side of the transformer to the charging capacitor;
    generating pulses in the resonant circuit, the pulses alternating in polarity to reset the transformer core after each pulse; and
    regulating a maximum voltage across the charging capacitor.

20. A method as recited in claim 19 wherein the regulating step is accomplished using a crowbar switch connected to the low voltage side of the transformer.

* * * * *